(12) United States Patent
Bi et al.

(10) Patent No.: US 6,438,380 B1
(45) Date of Patent: *Aug. 20, 2002

(54) SYSTEM FOR ROBUST LOCATION OF A MOBILE-TRANSMITTER

(75) Inventors: Qi Bi, Morris Plains; Wen-Yi Kuo, Parsippany; Sirin Tekinay, Mahwah, all of NJ (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/808,693

(22) Filed: Feb. 28, 1997

(51) Int. Cl.[7] .............................. H04Q 7/20; G01S 3/02
(52) U.S. Cl. ...................... 455/456; 455/67.1; 455/404; 342/465
(58) Field of Search ................................. 455/422, 432, 455/433, 456, 435, 440, 517, 524, 67.1, 404, 95; 342/357.01–357.05, 357.17, 450, 453, 457, 465

(56) References Cited

U.S. PATENT DOCUMENTS

| 4,494,119 A | * | 1/1985 | Wimbush | 342/457 |
|---|---|---|---|---|
| 4,633,463 A | * | 12/1986 | Mack | 455/524 |
| 4,742,357 A | * | 5/1988 | Rackley | 342/457 |
| 5,208,756 A | * | 5/1993 | Song | 342/457 |
| 5,327,144 A | * | 7/1994 | Stilp et al. | 342/457 |
| 5,509,028 A | * | 4/1996 | Marque-Pucheu | 455/524 |
| 5,600,706 A | * | 2/1997 | Dunn et al. | 455/456 |
| 5,666,662 A | * | 9/1997 | Shibuya | 455/456 |
| 5,673,305 A | * | 9/1997 | Ross | 455/457 |
| 5,883,598 A | * | 3/1999 | Parl et al. | 342/457 |
| 5,943,014 A | * | 8/1999 | Gilhousen | 455/456 |
| 5,959,580 A | * | 9/1999 | Maloney et al. | 342/457 |
| 6,119,013 A | * | 9/2000 | Maloney et al. | 455/456 |

* cited by examiner

Primary Examiner—Lester G. Kincaid
(74) Attorney, Agent, or Firm—Harness, Dickey & Pierce, PLC

(57) ABSTRACT

The present invention is a more accurate system for estimating the location of a mobile-telephone without significantly increasing the interference level for other mobile-telephones in the same or neighboring cells. In one embodiment, the present invention uses a plurality of location terminals deployed throughout a cell to increase the chances of detecting line-of-sight signals and the signal-to-noise ratio at the location terminals. In this embodiment, a wireless communication network transmits receive information to the plurality of location terminals instructing each of the location terminals to receive a signal from a particular mobile-telephone. Specifically, the location terminal is instructed to monitor a specific communication channel during a specific time interval. Upon receiving the signal, each of the location terminals produces detection information that is used by a location processor to estimate a location for the mobile-telephone, wherein the detection information includes times-of-arrival of the signal at each of the location terminals. In one embodiment, the location processor uses well-known location techniques, such as time difference of arrival, ranging, etc., to estimate the location for the mobile-telephone.

32 Claims, 7 Drawing Sheets

★ BS: BASE STATION
▲ LT: LOCATION TERMINAL
■ MS: MOBILE STATION

CELL COVERAGE

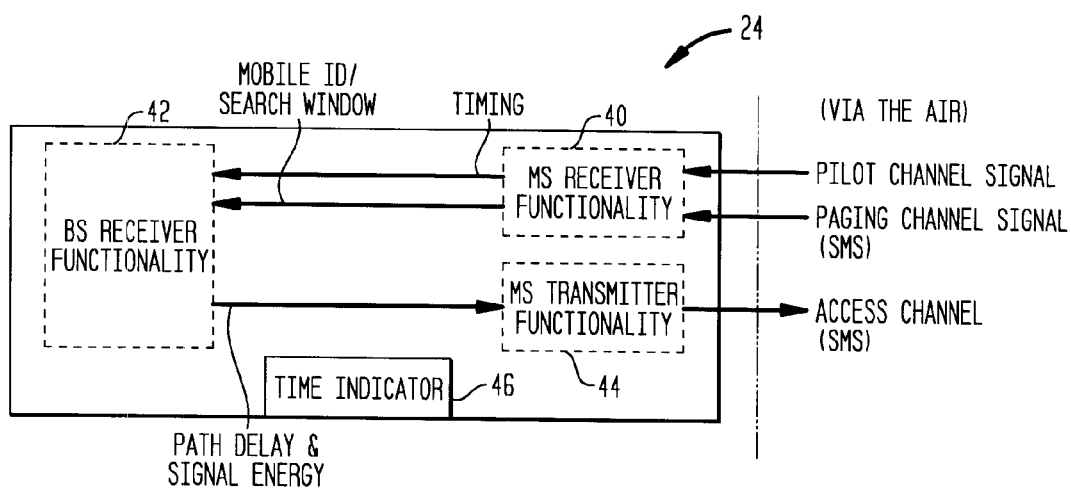
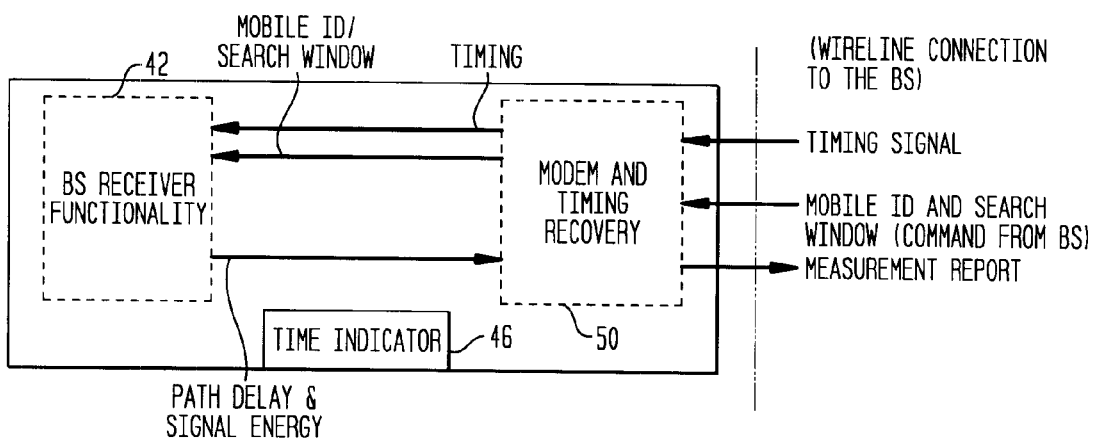

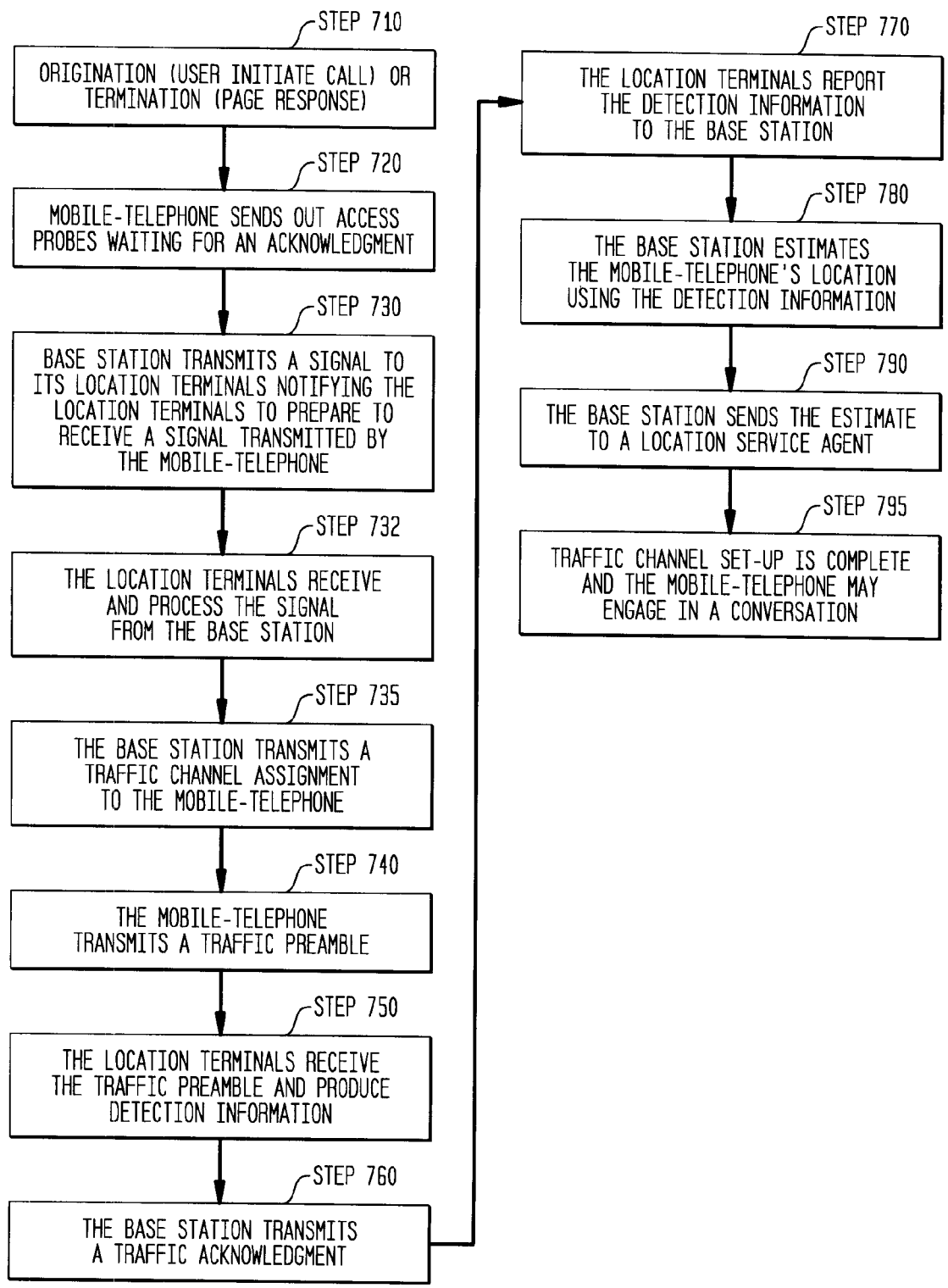

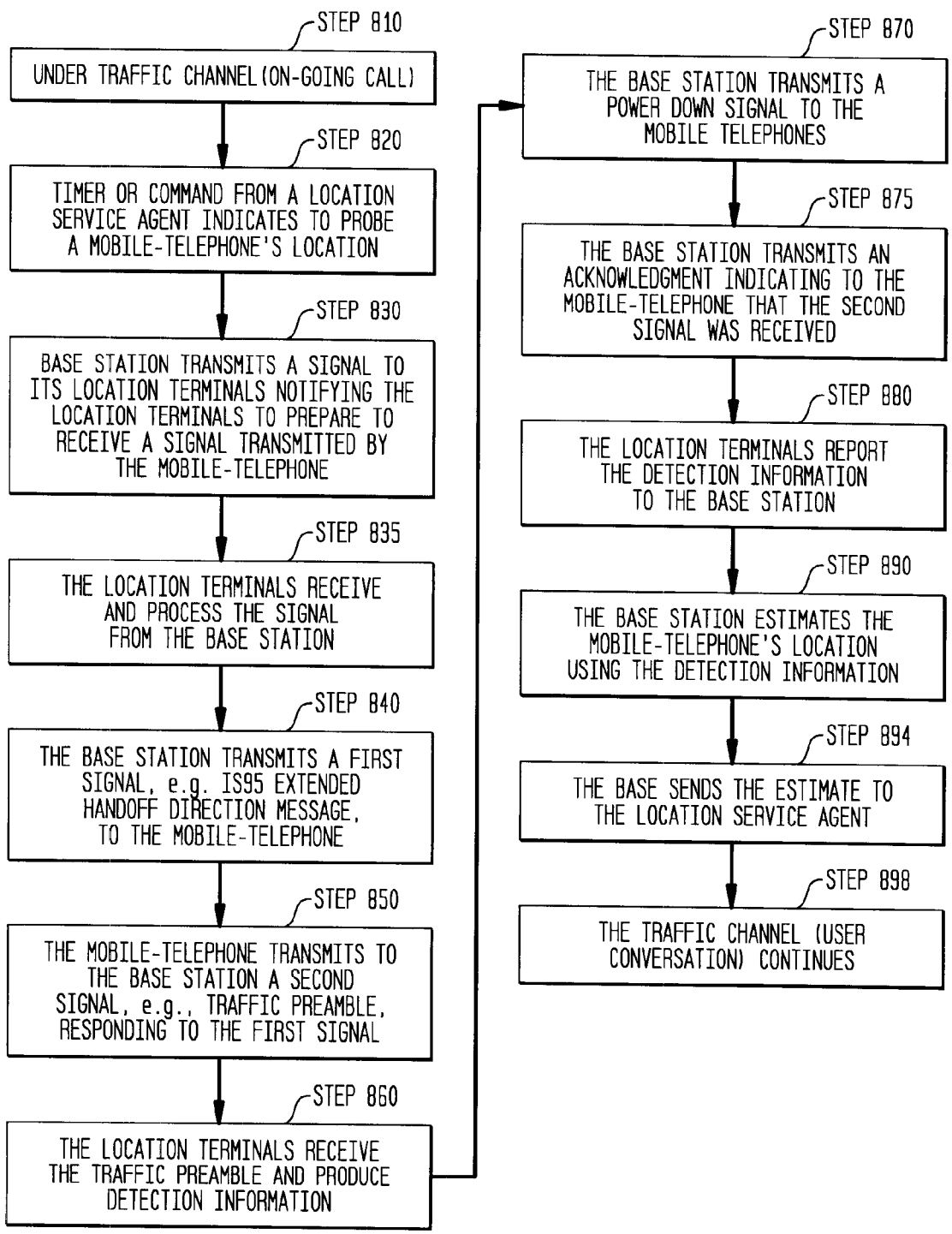

SYSTEM FOR ROBUST LOCATION OF A MOBILE-TRANSMITTER

FIELD OF THE INVENTION

The present invention relates generally to wireless communication systems and, in particular, to mobile-telephone location systems.

BACKGROUND OF THE RELATED ART

The Federal Communication Commission (FCC) has requested all cellular and Personal Communication System (PCS) based operators to provide emergency 911 location services for mobile-telephones. Solutions to this challenging issue include typical prior art systems that use well-known location techniques, such as time difference of arrival (TDOA), ranging, angle-of-arrival, etc., to yield a good estimate of a mobile-telephone's location. These location techniques typically involve the use of times-of-arrival observed at distributed locations together with "triangulation" principles to determine a mobile-telephone's location.

To determine a mobile-telephone's location to an acceptable accuracy using triangulation principles, at least three detectors should be able to detect a signal transmitted from a signal source and record the times-of-arrival at each of the detectors. Alternately, to determine a mobile-telephone's location, one detector should be able to detect a signal transmitted from at least three signal sources and record the times-of-arrival of each signal at the detector. Referring to FIG. 1, there is shown an illustration of a prior art location system 10. As shown in FIG. 1, the location system 10 includes a plurality of detectors 12–18 which are associated with geographical areas commonly referred to as cells 22–28. To locate a mobile-telephone 30, the detectors in the cells surrounding the mobile-telephone 30, i.e., detectors 12,13,15, should each be able to detect and record times-of-arrival for a signal transmitted from the mobile-telephone 30.

In some instances, a detector may detect the arrival of the same signal more than once due to reflections—that is, the signal transmitted from the mobile-telephone may travel multiple paths to the same detector. For example, suppose the mobile-telephone 30 transmits a signal S. The signal S will arrive at the detector 13 via a path P1, which is the shortest or most direct path from the mobile-telephone to the detector. The path P1 is referred to herein as a "line-of-sight path." The same signal S, however, may also arrive at the same detector 13 along paths P2, P3, which are paths longer or less direct than the line-of-sight path P1. The paths P2, P3 are referred to herein as "non line-of-sight paths." It is well-known that the times-of-arrival for line-of-sight signals provide location systems with a more accurate estimation of a mobile-telephone's location than the times-of-arrival for non line-of-sight signals, thus a location system depends in part on its ability to receive and/or detect line-of-sight signals.

Line-of-sight signals are distinguishable from non line-of-sight signals (provided they are sufficiently far apart from each other) because the former signals will travel the shortest, most direct path to the detectors, thereby arriving first at the detectors. Thus, the first signal detected by the detector is generally assume to be the line-of-sight signal. However, in areas such as urban environments, the line-of-sight signals may be highly attenuated or degraded by the time they arrive at the detector, thereby impeding the detector's ability to detect such signals. The location system's inability to detect line-of-sight signals may cause it to mistakenly assume later arriving non line-of-sight signals to be line-of-sight signals, thereby adversely affecting the location system's estimate of the mobile-telephone's location.

To compensate for possible attenuation or degradation of the line-of-sight signals, the prior art location systems may require the mobile-telephone to transmit such signal at higher power levels. This would increase the signal-to-noise ratio at the detector, thereby increasing the likelihood of detecting the line-of-sight signals. However, increasing the power level of the signals increases the interference level, i.e., noise, for other mobile-telephones in the same or neighboring cells. One possible solution for achieving increased signal-to-noise ratio without prolong interference level increases involves the transmission of signals at higher power levels for short time periods and performing extended integration in demodulation. This solution, however, has associated capacity/performance penalties, i.e., increased interference levels. Accordingly, there exist a need for a more accurate system for estimating a mobile-telephone's location without significantly increasing the interference level for other mobile-telephones in the same or neighboring cells.

SUMMARY OF THE INVENTION

The present invention is a more accurate system for estimating the location of a mobile-telephone without significantly increasing the interference level for other mobile-telephones in the same or neighboring cells. Specifically, the present invention uses improved line-of-sight signal detection to enhance its estimation of a mobile-telephone's location.

In one embodiment, the present invention comprises a wireless communication network and a plurality of location terminals deployed throughout a cell to increase the chances of detecting line-of-sight signals and the signal-to-noise ratio at the location terminals. In this embodiment, the wireless communication network transmits receive information to the plurality of location terminals instructing each of the location terminals to receive a signal from a particular mobile-telephone. Specifically, the location terminal is instructed to monitor a specific communication channel during a specific time interval. Upon receiving the signal, each of the location terminals produces detection information that is used to estimate a location for the mobile-telephone. Specifically, the detection information includes times-of-arrival and strengths of the signal at each of the location terminals.

BRIEF DESCRIPTION OF THE DRAWINGS

The features, aspects, and advantages of the present invention will become better understood with regard to the following description, appended claims, and accompanying drawings where:

FIG. 4 depicts a functional block diagram of a location terminal in accordance with one embodiment of the present invention which communicates with the base station over an air interface;

FIG. 5 depicts a functional block diagram of a location terminal in accordance with one embodiment of the present invention which communicates with the base station via a wireline connection;

FIG. 7 depicts a flowchart for locating a mobile-telephone that is originating a telephone call or responding to a page using the location terminal shown in FIG. 4; and FIG. 8 depicts a flowchart for locating a mobile-telephone that is engaged in a telephone conversation using the location terminal shown in FIG. 4

DETAILED DESCRIPTION

Figure 1:
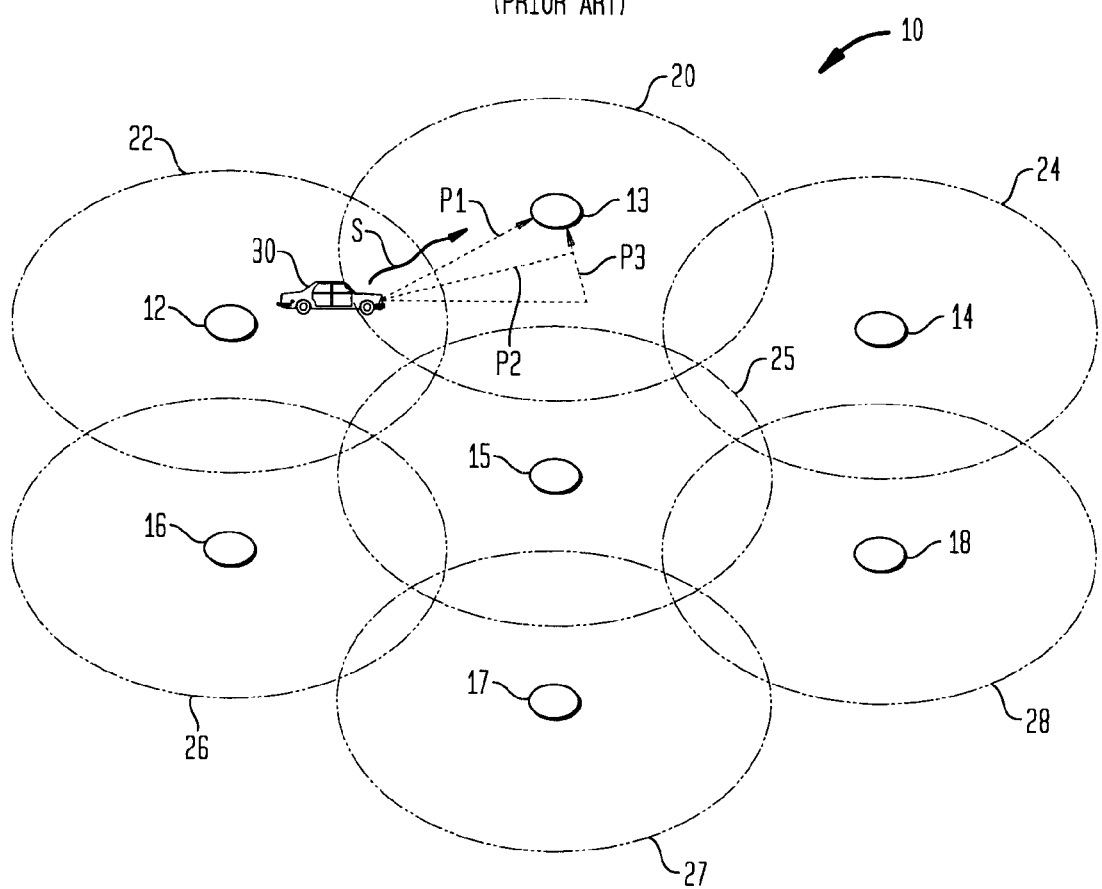
FIG. 1 depicts an illustration of a prior art location system.
Figure 2:
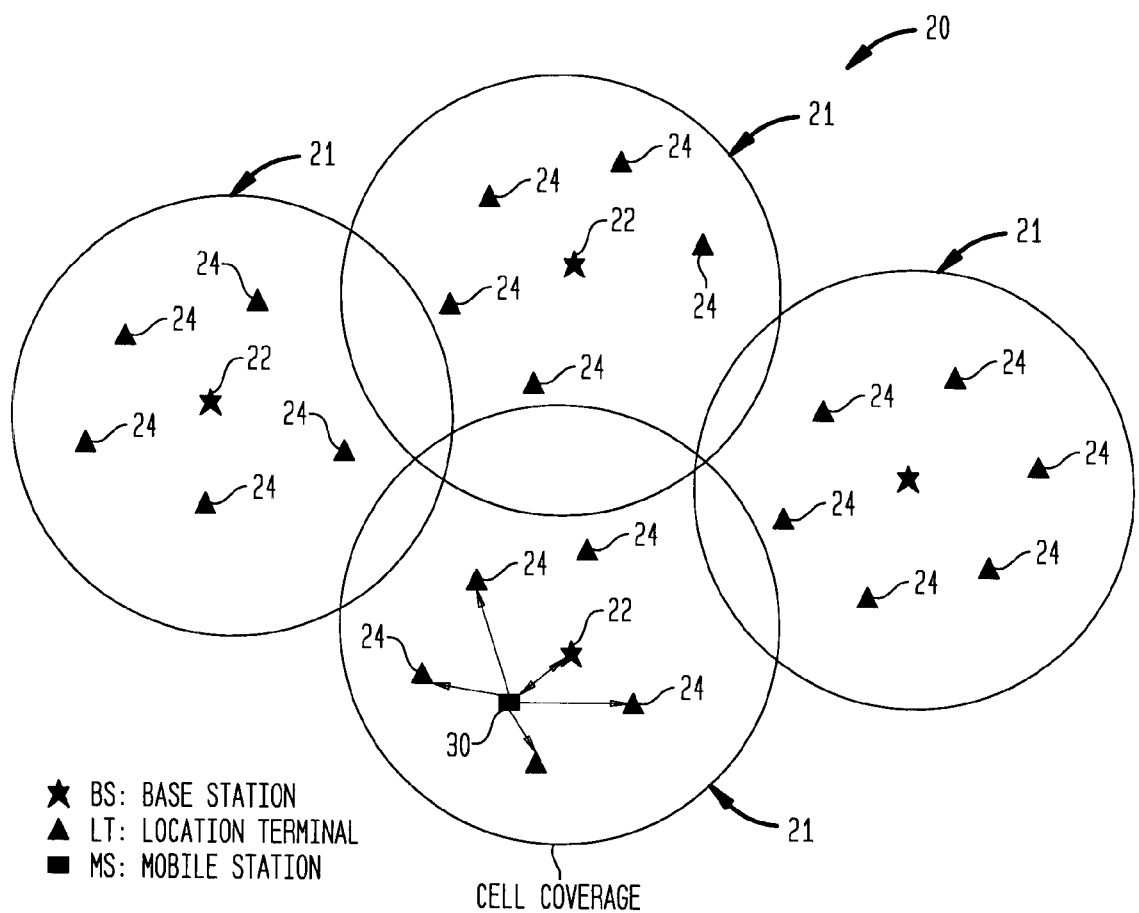
FIG. 2 depicts a system for locating a mobile-telephone in accordance with one embodiment of the present invention.

Referring to FIG. 2, there is shown a system for locating a mobile-telephone in accordance with one embodiment of the present invention. As shown in FIG. 2, a wireless communication network 20 is divided geographically into a plurality of cells 21, wherein each cell 21 has associated a base station 22 and a plurality of location terminals 24. In one embodiment, the base station is a system operable to perform location services using the location terminals. Specifically, the base station is operable to instruct the location terminals to receive a signal transmitted from a particular mobile-telephone, and to estimate the mobile-telephone's location using times corresponding to the arrival of the signal and signal strengths at each of the location terminals.

Figure 3:
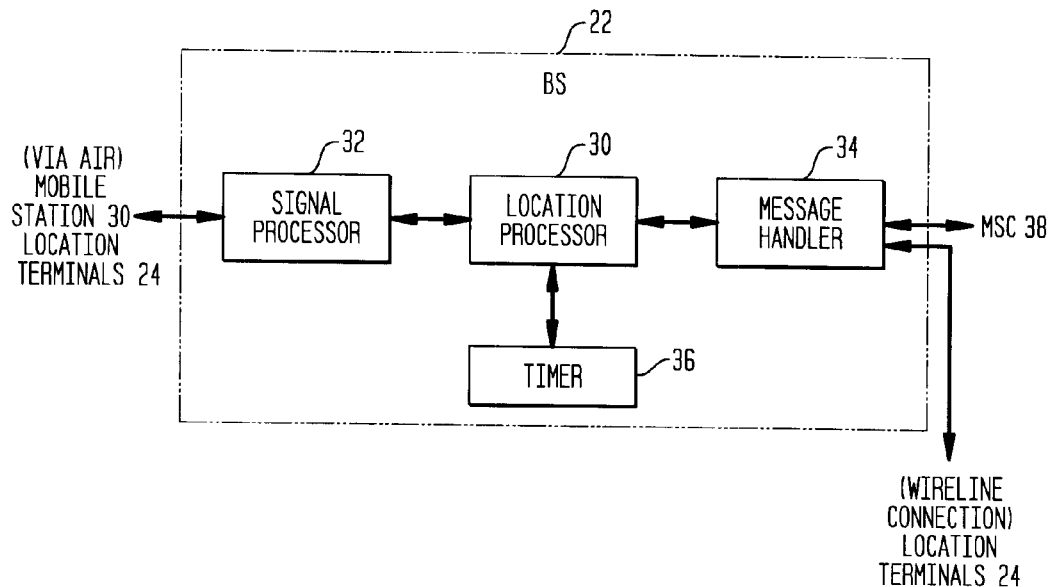
FIG. 3 depicts a functional block diagram of a base station in accordance with one embodiment of the present invention.

Referring to FIG. 3, there is shown a functional block diagram of a base station 22 in accordance with one embodiment of the present invention. As shown in FIG. 3, the base station 22 includes a location processor 30, a signal processor 32, a message handler 34, and a time indicator 36 for measuring and denoting time at the base station. The location processor 30 is a computer processor or equivalent with software processes for performing location services, which include estimating a location for the mobile-telephone using one of the well-known location techniques, such as ranging, time difference of arrival, angle of arrival, etc., and instructing the location terminals 24 and the mobile-telephones to perform specific actions, such as receive or transmit a signal.

In one embodiment, the location processor performs the location services automatically or "on-demand", e.g., upon a request from a subscriber or upon detection of a predetermined telephone number being dial. Alternately, the location processor 30 uses the time indicator 36 to initiate the location services—for example, upon expiration of a predetermined or random time interval, the time indicator 36 indicates such expiration to the location processor 30 causing the location processor 30 to perform the location services. Preferably, each of the time indicators 36 are time synchronized with respect to each other.

The signal processor 32 and message handler 34 provide the base station and location processor with means for communicating to the location terminals, mobile-telephones, and a Mobile Switching Center (MSC) 38. Specifically, the signal processor 32 is used by the location processor 30 to communicate with the location terminals 24 and/or the mobile-telephones via an air interface. In one embodiment, the signal processor is operable to modulate, receive and transmit signals from and to the location terminals and mobile-telephones via communication channels referred to herein as pilot channels, paging channels, traffic channels and access channels. By contrast, the message handler 34 is used by the location processor 30 to communicate via a wireline connection with the MSC 38 and/or the location terminals 24. Like the signal processor, the message handler 34 is also operable to modulate and demodulate signals. Note that signals transmitted from the base station, location terminal, or mobile-telephone are also referred to herein as base station signals, location terminal signals, and mobile-telephone signals, respectively.

Figure 3A:
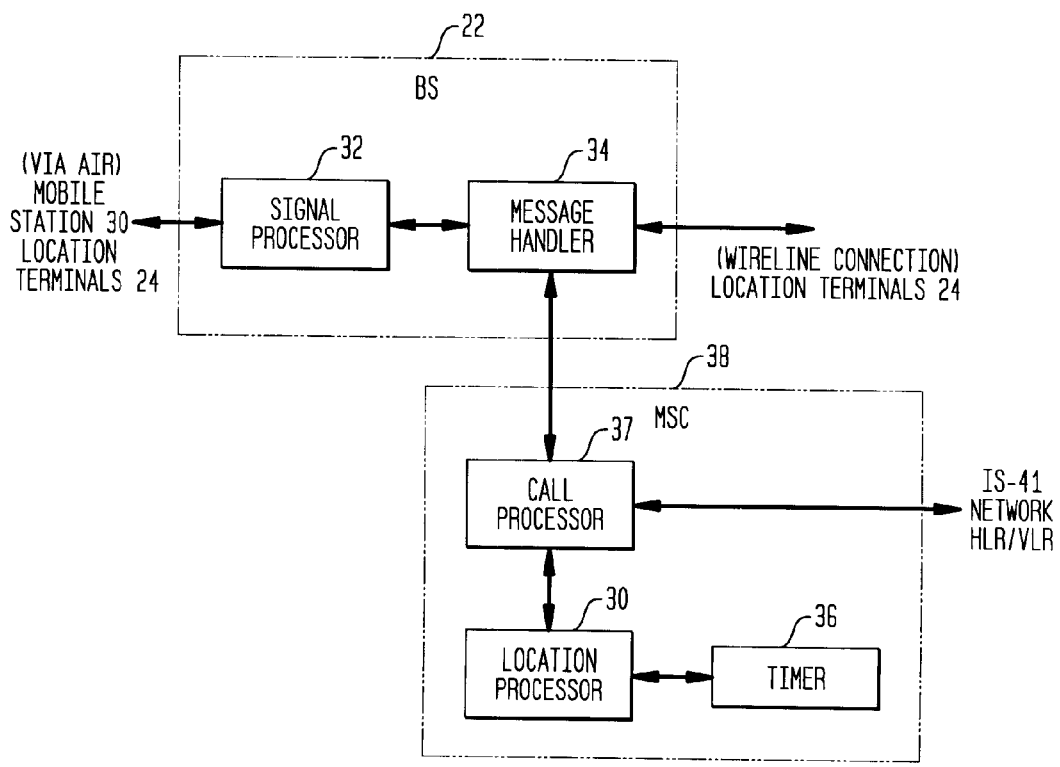
FIG. 3a depicts a function block diagram of a wireless communication network in accordance with one embodiment of the present invention.

Advantageously, this embodiment of the base station 22 in FIG. 3 reduces the location related messaging across the wireless communication network 20 by confining the location related messaging to the base station. In an alternate embodiment of the present invention, the location processor can be located within the MSC 38, as shown in FIG. 3a. In this embodiment, the message handler 38 is used to relay and receive information to and from the location processor 30 via a call processor 37.

The location terminals 24 are devices for receiving signals according to the instructions of a base station, producing detection information, and communicating the detection information to the base station. Referring to FIG. 4, there is shown a functional block diagram of a location terminal 24 in accordance with one embodiment of the invention which communicates with the base station over an air interface. As shown in FIG. 4, the location terminal 24 has a first component 40 with the functionality of a mobile-telephone receiver, a second component 42 with the functionality of a base station receiver, a third component 44 with the functionality of a mobile-telephone transmitter, and a time indicator 46 for measuring and denoting time at the location terminal.

In one embodiment, the mobile-telephone receiver component 40 is operable to receive and demodulate signals and re-set the time indicator 46 to a time specified by the base station, the base station receiver component 42 is operable to receive and demodulate signals according to the instructions of the base station and produce the detection information, i.e., record a time (or time stamp) when the signals were received using the time indicator 46 and measure the strength of the received signals, and the mobile-telephone transmitter component 44 is operable to modulate the detection information onto a signal and transmit the modulated signal. Preferably, the mobile-telephone receiver and transmitter components 40, 44 communicate with the base station using the same protocol as the mobile-telephones (in the same wireless communication network), thus minimizing the need to change existing wireless communication standards.

In one embodiment, the instructions from the base station include receive information which, in one embodiment, comprises communication channel information for identifying a specific communication channel to monitor, a search window for defining a time interval for monitoring the communication channel, and timing information for time synchronizing the location terminals with a common time reference. Note that the communication channel information will vary according to the multiplexing technique being used by the wireless communication network and the mobile-telephones—that is, the communication channel information can include a frequency range, a time slot and/or a code. For example, if Coded Division Multiple Access (CDMA) is the multiplexing technique, then the communication channel information should specify a frequency range and a code to monitor. Whereas if Time Division Multiple Access (TDMA) is the multiplexing technique, then the communication channel information should specify a frequency range and a time slot. In an alternate embodiment, the functionalities of the base station receiver component and the mobile-telephone receiver component can exist within a single component.

As mentioned earlier, the time indicators 46 are used to record a time when a signal is received by the base station receiver component, i.e., time-of-arrival, which are then used to estimate a mobile-telephone's location. To enhance the accuracy of the estimates, the time indicators 46 should be time synchronized to nanosecond levels with a common time reference. In one embodiment, the time indicator 46 can be time synchronized using a time specified by the base station. For example, the base station transmits to each of the location terminals timing information, e.g., the current time indicated by the base station's time indicator 36, which can be used by the mobile-telephone receiver component 40 to re-set their respective time indicators 46 to a common time reference. If the distances from the base station to each of the location terminals are the same, then the time indicators can be time synchronized by re-setting them to the time indicated by the timing information. If the distances from the base station to each of the location terminals vary for each location terminal, then offsets may also be used to time synchronize the time indicators 46. For example, suppose it takes two and four nanoseconds for a signal to travel from the base station to a first and a second location terminal, respectively. To time synchronize the first and second location terminals, the time indicators of the first and second location terminals are re-set to the time indicated by the timing information plus two and four nanoseconds, respectively—that is, the two and four nanoseconds are offsets for the first and second location terminals, respectively. Alternately, the time indicators 46 can be time synchronized using the well-known Global Positioning Satellite (GPS) system or equivalent. Thus, the timing information from the base station is not used to time synchronize the time indicators 46.

Referring to FIG. 5, there is shown a functional block diagram of the location terminal 24 in accordance with another embodiment of the present invention which communicates with the base station via a wireline connection. As shown in FIG. 5, the mobile-telephone receiver and transmitter components 40, 44 in FIG. 4 are substituted with a modem 50 having a wireline connection to the base station. In this embodiment, the modem 50 has timing recovery capabilities, i.e., capable of recovering a time from the timing information, and the wireline connection should provide a timing accuracy of 1.23 MHz for correct recovery of the timing information—that is, the timing accuracy of 1.23 MHz is needed to fulfill granularity requirements for time synchronization of the location terminals. The modem 50 should be operable to receive and transmit information from and to the base station and re-set the time indicator 46 using the timing information.

Figure 6:
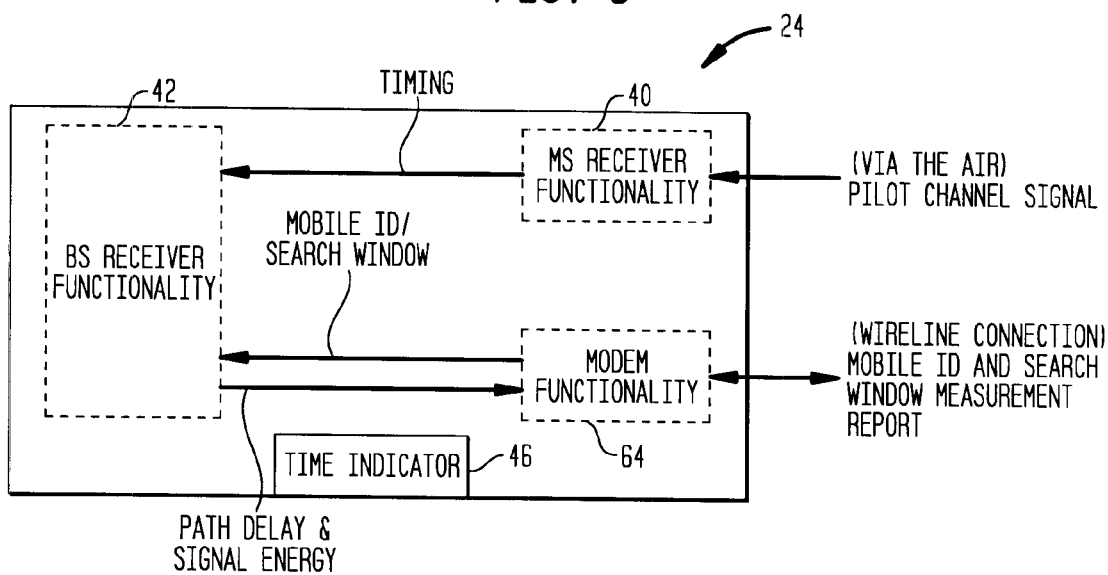
FIG. 6 depicts a functional block diagram of a location terminal in accordance with one embodiment of the present invention which communicates with the base station via a wireline connection and an air interface.

Referring to FIG. 6, there is shown a functional block diagram of the location terminal 24 in accordance with another embodiment of the present invention which communicates with the base station via a wireline connection and/or an air interface. As shown in FIG. 6, the mobile-telephone transmitter component 44 of FIG. 4 is substituted with a modem 64. This provides the location terminal 24 with the capability to communicate via a wireline connection and/or an air interface. In this embodiment, the timing information is provided to the location terminal (via the mobile-telephone receiver component) by the base station over an air interface, and all other information or instructions can be provided over the wireline connection. This configuration simplifies the hardware requirement in the wireline connection for the location terminal shown in FIG. 5—that is, the wireline connection for the location terminal of FIG. 6 does not require a timing accuracy of 1.23 MHz. Without the timing accuracy requirement, the wireline connection can thus be any simple modem type connection.

The number of location terminals deployed within a cell and the manner in which the location terminals are deployed with the cell, in one embodiment, should increase the chances of detecting line-of-sight signals. For example, in urban environments where multipath signals are conducive, more location terminals are deployed to better detect line-of-sight signals. In an alternate embodiment, at least three location terminals have a line-of-sight to any spot within the cell in which the mobile-telephone might be located. In another embodiment, the deployment of the location terminals should at least provide coverage to the peripheral of the cell. Advantageously, the deployment of the location terminals throughout the cell increases the signal-to-noise ratio at the location terminals (since the location terminals will generally be closer to the mobile-telephones than the base station) without increasing the power level of the transmitting mobile-telephone.

Note that the location terminals of FIGS. 4, 5 and 6 are passive devices in that the location terminals communicate only with base stations and do not broadcast to mobile-telephones. Advantageously, the passive nature of the location terminals minimizes the location terminals role in increasing the interference level in the cell and reduces the amount of power needed for the operation of the location terminals. Additionally, zoning approval generally associated with the deployment of transmitting devices is unnecessary since the location terminals communicate with base stations in essentially the same manner as would mobile-telephones.

For illustrative purposes, the present invention will be described herein with reference to CDMA wireless communication networks that uses a wider frequency spectrum to spread the signals. This should not be construed, however, to limit the present invention to CDMA networks. It would be apparent to one of ordinary skill in the art that the present invention could be practiced in narrowband networks such as Time Division Multiple Access (TDMA), Global System for Mobile Communication (GSM), and analog Frequency Modulation (FM).

In operation, the present invention can locate mobile-telephones transmitting known sequences, such as traffic preambles, or unknown sequences, such as traffic data. Referring to FIG. 7, there is shown a flowchart 700 for locating a mobile-telephone that is originating a telephone call (i.e., initiating an outgoing call) or responding to a page (i.e., answering an incoming call) using the location terminal of FIG. 4. As shown in FIG. 7, in step 710, the mobile-telephone originates a telephone call or responds to a page. In step 720, the mobile-telephone continuously transmits access probes via an access channel requesting the base station for a traffic or communication channel assignment.

Upon arrival of the access probe, in step 730, the primary base station notifies the associated location terminals to prepare to receive a signal transmitted from the mobile-telephone. Specifically, the base station transmits to the location terminals instructions with receive information including timing information for time synchronizing the location terminals, communication channel information identifying the traffic channel (being assigned), and a search window specifying a time interval to monitor the traffic channel. In one embodiment, the timing information is modulated onto a pilot channel signal, and the communication channel information and search window are modulated onto a paging channel signal.

In step 732, the location terminals receive and process the base station signals, i.e., pilot channel and paging channel signals. Specifically, the mobile-telephone receiver components receive and demodulate the receive information from the pilot and paging channel signals, respectively, re-set their associated time indicators (to a common time reference) using the timing information, and passes the receive information to the base station receiver component such that the base station receiver component can monitor the specified traffic channel during the search window.

In step 735, the primary base station acknowledges the access probes by transmitting via the paging channel a traffic channel assignment to the mobile-telephone. In step 740, upon receiving the acknowledgment, i.e., traffic channel assignment, the mobile-telephone transmits a traffic channel signal modulated with a traffic preamble. The mobile-telephone will continuously transmit the traffic channel signal at increasing power levels until it receives another acknowledgment from the primary base station or until a 2-second timer (or other predetermined or random time interval) expires. In step 750, the location terminals receive the traffic channel signal and produce detection information. Specifically, the location terminals produce the detection information by time stamping and measuring the strength of the traffic channel signal received while monitoring the specified traffic channel during the search window.

Note that the time stamp should denote the time-of-arrival for the traffic preamble. However, the received traffic channel signal may include extraneous data in addition to the traffic preamble. In such cases, the extraneous data may cause ambiguities regarding the actual time-of-arrival of the traffic preamble, thereby adversely affecting the present invention's estimate of the mobile-telephone's location. This type of ambiguity, in one embodiment, is alleviated using a traffic preamble of a predetermined data length having a known data sequence. In this embodiment, the traffic preamble is demodulated from the traffic channel signal and distinguished and/or separated from the extraneous data using the predetermined data length and known data sequence. By distinguishing and/or separating the traffic preamble from the extraneous data, a more accurate time-of-arrival can be determined for the traffic preamble, thus enhancing the estimate for the mobile-telephone's location.

In another embodiment of the present invention, the traffic channel signal may be modulated with unknown data sequences of varying length. In this embodiment, well-known "blank and burst" techniques are used to distinguish and/or separate one set of data sequence from another set of data sequence, thereby allowing determination of a more accurate time-of-arrival for a particular set of data sequence and enhancing the estimate of the mobile-telephone's location.

In step 760, the primary base station transmits to the mobile-telephone via the paging channel a traffic acknowledgment in response to the traffic channel signal transmitted in step 740. In one embodiment, the primary base station can intentionally delay transmitting to the mobile-telephone the traffic acknowledgment. This causes the mobile-telephone to maintain transmission of the traffic channel signal and increase the power level of the signal, thereby increasing the signal-to-noise ratio and the chance of detection by the location terminals—that is, traffic preambles are continuously transmitted by the mobile-telephone at increasing power levels until an acknowledgment from a primary base station, i.e., base station to which the mobile-telephone is in communication, is received by the mobile-telephone. Note that this is one of the basic fundamentals of CDMA: using power level control to solve the near-far problem and to control interference such that capacity advantages can be achieved.

In step 770, the location terminals report their detection information to the primary base station, i.e., each location terminal modulates the detection information onto an access channel signal and transmits the access channel signal to the primary base station. In step 780, the primary base station receives the detection information from each of the location terminals and estimates a location based on such detection information using one of the aforementioned well-known location techniques. In one embodiment, the location processor uses the signal strength measurements to determine a reliability factor for a corresponding time-of-arrival. For example, if the signal strength is below a threshold, then the location processor may determine the received signal to be unreliable. In such a case, the corresponding time-of-arrival is not used or is given lesser weight when estimating the mobile-telephone's location.

Referring to FIG. 8, there is shown a flowchart 800 for locating a mobile-telephone that is engaged in a telephone conversation using the location terminal of FIG. 4. In step 810, the mobile-telephone is engaged in a telephone conversation, i.e., transmitting traffic data over an assigned traffic channel. In step 820, the location processor determines whether to initiate the location services for a mobile-telephone. In one embodiment, the location processor initiates the location services if a predetermined or random time interval expires. In another embodiment, the location processor initiates the location services upon demand or request. In step 830 (as in step 730), the base station notifies the associated location terminals to prepare to receive a signal transmitted from a particular mobile-telephone. In step 835 (as in step 732), the location terminals receive and process the signals from the base station.

In step 840, the primary base station transmits to the mobile-telephone via the assigned traffic channel a first signal causing the mobile-telephone to respond, in step 850, with a second signal via the same assigned traffic channel. In one embodiment, the first signal is a well-known IS95 Extended Handoff Direction Message instructing the mobile-telephone to perform a "handoff" to the same primary base station using the same traffic channel, e.g., same frequency range and code. In response to the IS95 Extended Handoff Direction Message, the mobile-telephone proceeds to perform the handoff by sending out the second signal at a power level and duration time specified in the IS95 Extended Handoff Direction Message. In one embodiment, for purposes of enhancing detection, the power level of the second signal is heightened and the second signal is a traffic channel signal modulated with a traffic preamble of a predetermined data length having a known data sequence.

In step 860 (as in step 750), the location terminals receive the traffic channel signal and produces the detection information. In step 870, the primary base station sends out a signal instructing the mobile-telephone to decrease its power level such that the interference caused by the heightened power level of the second signal is minimized. In step 875, the primary base station transmits to the mobile-telephone via the assigned traffic channel an acknowledgment indicating to the mobile-telephone that the primary base station received the traffic preamble, thereby completing the handoff. In step 880 (as in step 755), the location terminals report the detection information to the primary base station. In step 890 (as in step 770), the location processor estimates the location based on the detection information.

Although the present invention has been described in considerable detail with reference to certain embodiments, other versions are possible. Therefore, the spirit and scope of the present invention should not be limited to the description of the embodiments contained herein.

We claim:

1. A method for locating a mobile-transmitter using a plurality of location terminals within a cell comprising the steps of:

transmitting receive information to the plurality of location terminals instructing each of the location terminals to receive a first signal from a particular mobile-transmitter in communication with a base station within the cell, wherein the location terminal transmits to the base station and not to the mobile-terminal;

receiving the first signal transmitted from the mobile-transmitter using the receive information at each of the plurality of location terminals to produce detection information; and estimating a location for the mobile-transmitter using the detection information, said transmitting step being automatically performed in response to expiration of a time interval.

2. The method of claim 1, wherein the receive information includes communication channel information specifying a particular communication channel for the plurality of location terminals to monitor.

3. The method of claim 2, wherein the receive information includes a search window indicating a time interval for monitoring the communication channel.

4. The method of claim 3, wherein the communication channel information and the search window are transmitted via a paging channel.

5. The method of claim 3, wherein the communication channel information and the search window are transmitted via a wireline connection.

6. The method of claim 3, wherein the step of receiving the first signal includes the step of:

monitoring the communication channel for the time interval specified by the search interval.

7. The method of claim 2, wherein the receive information includes timing information for synchronizing the plurality of location terminals using a common time reference.

8. The method of claim 7, wherein the timing information is transmitted via a pilot channel.

9. The method of claim 1, wherein the detection information includes times-of-arrival for the signal at each of the plurality of location terminals.

10. The method of claim 9, wherein the detection information includes signal strength measurements at each of the plurality of location terminals.

11. The method of claim 1, wherein the step of estimating the location includes the step of:

transmitting the detection information via an access channel to a wireless communication network.

12. The method of claim 1 comprising the additional step of:

transmitting a second signal to the mobile-transmitter to cause the mobile-transmitter to cease transmitting the first signal.

13. The method of claim 12, wherein the second signal is transmitted to the mobile-transmitter when the first signal is at a particular power level.

14. The method of claim 12, wherein the second signal is transmitted via a paging channel.

15. The method of claim 1 comprising the additional step of:

transmitting a second signal to the mobile-transmitter to cause the mobile-transmitter to transmit the first signal.

16. The method of claim 15, wherein the second signal instructs the mobile-transmitter to transmit the first signal using a particular communication channel.

17. The method of claim 15, wherein the second signal instructs the mobile-transmitter to transmit the first signal at a particular power level using a particular communication channel.

18. The method of claim 17, comprising the additional step of:

transmitting a third signal to the mobile-transmitter to cause the mobile-transmitter to lower the power level at which the first signal is being transmitted.

19. The method of claim 15, wherein the second signal is transmitted via a paging channel.

20. The method of claim 1, wherein the step of receiving the first signal includes the step of:

determining a time-of-arrival for a known data sequence at each of the plurality of location terminals.

21. A method for locating a mobile-transmitter comprising the steps of:

receiving at a location terminal receive information specifying a particular communication channel to monitor from a base station located within a same cell as the location terminal, wherein the location terminal transmits to the base station and not to the mobile-terminal, and wherein said receive information is automatically transmitted in response to expiration of a time interval;

monitoring the communication channel;

recording a time-of-arrival corresponding to a time when a signal is received at the location terminal via the communication channel; and transmitting the time-of-arrival to a location processor.

22. The method of claim 21, wherein the communication channel is monitored for a time interval specified by a search window included in the receive information.

23. The method of claim 21 further comprising the step of:

time synchronizing the location terminal to a time reference using a time indicated by the receive information.

24. The method of claim 21, wherein the step of recording the time-of-arrival includes the step of:

examining the received signal for a known data sequence.

25. The method of claim 21, wherein the step of recording the time-of-arrival includes the step of:

measuring a signal strength for the received signal.

26. A system for locating a mobile-telephone within a geographical area covered by a plurality of cells in a wireless network, comprising:

a base station within each cell, including
       a processor,
       a detection device for detecting a telephone number dialed by said mobile-telephone, and
       a transmission device for automatically broadcasting information identifying a communication channel in response to said detection of said telephone number being dialed; and a plurality of location terminals within each cell, each location terminal including
       a reception device for receiving said channel-identifying information from said base station, a reception device for receiving a signal transmitted from said mobile-telephone over said channel identified by said received channel-identifying information to produce detection information, wherein said processor determines a location of said mobile-telephone using detection information transmitted from one or more of said plurality of location terminals to said base station.

27. The system of claim 26, wherein each of said plurality of location terminals within a cell transmits to the base station within said cell and not to the mobile-telephone.

28. A system for locating a mobile-telephone within a geographical area covered by a plurality of cells in a wireless network, comprising:

a base station within each cell, including
a processor,
a request receiving device for receiving a request transmitted from said mobile-telephone, and
a transmission device for automatically broadcasting information identifying a communication channel in response said request received from said mobile-telephone; and a plurality of location terminals within each cell which transmit to the base station of said cell and not to said mobile-telephone, each location terminal including
a reception device for receiving said channel-identifying information from said base station,
a detection device for receiving a signal transmitted from said mobile-telephone over said channel identified by said received channel-identifying information to produce detection information, wherein said processor determines a location of said mobile-telephone using detection information transmitted from one or more of said plurality of location terminals to said base station.

29. A method for locating a mobile-telephone using a plurality of location terminals within a cell, comprising:

at a base station within the cell, transmitting channel-identifying information to the plurality of location terminals in response to a first signal transmitted from said mobile-telephone;

at each location terminal within the cell,
receiving a second signal transmitted from said mobile-telephone over a channel identified by said channel-identifying information to produce detection information, and
transmitting said detection information to said base station, such that said detection information is not transmitted to said mobile-telephone; and at said base station, estimating a location for the mobile-telephone using said detection information.

30. The method of claim 29, wherein the first signal includes at least one of a dialed telephone number and a location determination request.

31. A system for locating a mobile transmitter within a cell, comprising:

a base station within said cell, including
a processor, and
a transmission device for automatically transmitting information identifying a communication channel to said plurality of location terminals in response to expiration of a time interval; and a plurality of location terminals within said cell which transmit to the base station and not to said mobile-telephone, each location terminal including
a reception device for receiving said channel-identifying information from said base station,
a detection device for receiving a signal transmitted from said mobile transmitter over said channel identified by said received channel-identifying information to produce detection information, wherein said processor determines a location of said mobile-telephone using detection information transmitted from one or more of said plurality of location terminals to said base station.

32. The system of claim 31, wherein said information transmitted by said base station includes a search window indicating a time interval for receiving said signal transmitted from said mobile transmitter.

* * * * *